United States Patent [19]

Laskey et al.

[11] Patent Number: 5,581,870
[45] Date of Patent: Dec. 10, 1996

[54] METHOD OF INSTALLING INSULATION BETWEEN A RETAINING RING AND A ROTOR OF A DYNAMOELECTRIC MACHINE

[75] Inventors: Timothy J. Laskey, Saratoga Springs; William P. Dobbins, Clifton Park, both of N.Y.

[73] Assignee: General Electric Co., Schenectady, N.Y.

[21] Appl. No.: 335,613

[22] Filed: Nov. 8, 1994

[51] Int. Cl.$^6$ .................................................. H02K 15/02
[52] U.S. Cl. ............................ 29/598; 156/162; 310/271
[58] Field of Search ............................ 29/598; 310/271; 156/162

[56] References Cited

U.S. PATENT DOCUMENTS

| | | | |
|---|---|---|---|
| 4,170,505 | 10/1979 | Zgraggen | 29/598 X |
| 4,661,183 | 4/1987 | Beard | 310/271 X |
| 4,674,178 | 6/1987 | Patel | 29/598 |
| 5,115,556 | 5/1992 | Gavrilidis et al. | 29/598 X |

FOREIGN PATENT DOCUMENTS

| | | | |
|---|---|---|---|
| 661497 | 4/1963 | Canada | 310/271 |
| 4-101643 | 4/1992 | Japan | 310/271 |

*Primary Examiner*—Carl J. Arbes
*Attorney, Agent, or Firm*—Nixon & Vanderhye

[57] ABSTRACT

The apparatus includes a stand for mounting a mandrel against rotation and a winding assembly for disposition within the mandrel. The mandrel has a slot for receiving a flat sheet through a side wall of the mandrel. A clamping mechanism on the winding assembly clamps the leading edge to the winding assembly within the mandrel. By winding the assembly, the flat sheet is drawn into the mandrel and formed into an arcuate configuration. The mandrel with curved sheet is removed from the stand and disposed in an oven for setting the plastic material in the curved configuration whereby the flat sheet is preformed into a radius approximating the radius of the rotational part about which the insulation will be installed.

5 Claims, 3 Drawing Sheets

METHOD OF INSTALLING INSULATION BETWEEN A RETAINING RING AND A ROTOR OF A DYNAMOELECTRIC MACHINE

TECHNICAL FIELD

The present invention relates to apparatus and methods for forming arcuate insulation sheets for use in dynamoelectric machines, and particularly relates to apparatus and methods for forming arcuate electrical insulation sheets from flat sheets for fit about generally similarly arcuate-shaped elements of dynamoelectric machines to facilitate installation of the insulation sheets.

BACKGROUND

In a generator, motor, or other rotating electrical device, i.e., a dynamoelectric machine, insulation is disposed about field end windings, for example, about the rotor end, forming a rotational part of the dynamoelectric machine. The insulation is usually provided by sheets of glass epoxy laminate disposed in concentric layers about the rotating part. The sheets, e.g., Mylar, from which the laminates are formed, are typically provided cut to size in a flat condition and delivered to an assembly area. The flat sheets are conventionally of a size to overlie substantially about one-half of the circumference of the rotating part so that each concentric layer is comprised of two flat sheets molded into a semi-circular configuration. Initially a resin layer is applied between the sheets and the sheets are then placed into a half-cylindrical mold. Either hot or cold molding processes may be used to form the half-cylindrical insulation sheets. To assemble the molded sheets onto the rotational part, e.g., the rotor end, the sheets are held about the part by taping each layer and building up the insulation laminate. While this process has been used, it has been found that the resin used to impregnate the glass cloth gives off noxious fumes when the retaining ring of the dynamoelectric machine is shrink-fitted about the insulation laminate.

Another method for forming the insulation laminate about the rotational part involved taping flat insulation sheets about the part. The stiffness of the flat sheet insulation, however, required substantial quantities of tape to hold the flat sheets in the generally semi-cylindrical configuration. So much tape was required, however, that a layer of insulation could be lost in the multiple concentric layers of insulation. This method of installation is also time-consuming and presents a safety hazard because the sheet material will spring back into its flat condition with considerable force, unless restrained. Consequently, by bending the insulation material and attempting to hold it in place while fixing the material about the rotary part, there is presented substantial hazard to the installers should the material spring back into a flat condition. Moreover, excessive assembly time is required to manipulate the flat sheets and assemble them in their stressed or biased condition to form the numerous concentric layers of insulation material about the cylindrical part of the machine.

DISCLOSURE OF THE INVENTION

In accordance with the present invention, the sheets are preformed to an arcuate configuration approximating the radius of the rotatable part to which the sheets will ultimately be applied. That is, the sheets of insulating material are formed to hold the radius of the final product in an unrestrained condition, facilitating the installation of the insulation sheets about the rotary part and entirely eliminating any tendency of the sheets to spring back to their original flat condition. The prior hazard to the installers is thus entirely eliminated. Moreover, the present invention affords the capability of fabricating rotor retaining ring insulation in the field to support field maintenance and emergency outages and enabling field rewinds. It also eliminates the two problems noted above, first by providing formed laminates that can be fixed on the rotor with minimal taping, thus avoiding less of a layer of insulation, and secondly, by providing a char-resistant insulation which eliminates the noxious fumes upon application of the retaining ring. The present invention also reduces installation time.

To accomplish the foregoing, the present invention provides one or more, preferably a plurality of, cylindrical mandrels, each of which is disposable in an upright position on a stand in a manner to prevent its rotation relative to the stand. A slot is provided on a side wall of the mandrel through which a flat sheet of insulating material may be inserted. The stand carries a guide for facilitating insertion of the flat sheet of insulating material into the slot and into the mandrel.

A winding assembly is disposed in the mandrel and includes a peripheral clamp for releasably clamping the leading edge of the flat sheet. The winding assembly also includes a vertical axle or shaft which can be journalled at one end into a bearing at the lower end of the stand. The axle mounts a support arm at its upper end which can be secured to either the mandrel or the stand. With the leading edge of the flat sheet clamped to the winding assembly, and the flat sheet disposed in the slot, the winding assembly is rotated, preferably manually, to draw the flat sheet into the mandrel and hence form the flat sheet into an arcuate configuration within the mandrel. Once the sheet is in its arcuate configuration wholly within the cylindrical mandrel, the sheet may be unclamped from the winding assembly and the winding assembly removed from the mandrel. The mandrel is then removed from the stand and disposed in an oven where the curved insulation sheets, formed of a plastic thermosettable material, are heated and thermoset into the arcuate configuration.

It will be appreciated that a number of mandrels are used such that the necessary number of insulation sheets may be disposed in arcuate form in the mandrel and simultaneously heated in the oven to form the sheets necessary to form the insulation about the rotary part. The radius of the sheet within the mandrel is preferably somewhat smaller than the exact radius of the part over which the arcuate sheet will be disposed to accommodate any slight tendency of the sheet to return to its former flat condition. The stand and mandrels are portable and portable ovens may likewise be used whereby the dynamoelectric machines can be serviced in the field.

In a preferred embodiment according to the present invention, there is provided apparatus for forming a generally arcuate sheet of plastic material from a flat sheet thereof comprising a generally cylindrical forming mandrel having a slot along a side wall thereof extending generally parallel to a cylindrical central axis of the mandrel for receiving the flat sheet, a winding assembly for disposition within the cylindrical mandrel and including a clamp for releasably clamping an edge of the flat sheet of plastic material and a device for rotating the winding assembly for drawing the flat sheet clamped to the winding assembly into the mandrel whereby the flat sheet is bent into an arcuate sheet within the mandrel.

In a further preferred embodiment according to the present invention, there is provided a method of forming a generally arcuate sheet of plastic material from a flat sheet thereof, comprising the steps of providing a generally cylindrical mandrel having a slot along a side wall thereof extending generally parallel to a cylindrical central axis of the mandrel, inserting the flat sheet through the slot for locating a leading edge thereof within the mandrel, clamping the leading edge of the flat sheet to a winding assembly, rotating the winding assembly with the leading edge clamped thereto in the mandrel to wind the flat sheet about the interior of the cylindrical mandrel, heating the mandrel with the wound sheet therein to a temperature to set the plastic material within the mandrel and removing the arcuate sheet from the mandrel.

In a still further preferred embodiment according to the present invention, there is provided a method of installing insulation between a retaining ring and a rotor of a dynamoelectric machine comprising the steps of providing insulation sheets of a glass fabric impregnated with an epoxyphenolic resin, thermoforming the glass fabric impregnated sheets in an arcuate configuration for fitting about at least part of the rotor, fixing the formed sheets on the rotor and shrink-fitting the retaining ring onto the insulation.

Accordingly, it is a primary object of the present invention to provide novel and improved apparatus and methods for preforming flat sheets of insulating material into arcuate sheets approximating the curvature of rotary parts of a dynamoelectric machine to which the arcuate sheets are applied and which apparatus and methods may be utilized in factory or field installation of the insulation.

BEST MODE FOR CARRYING OUT THE INVENTION

Figure 1:
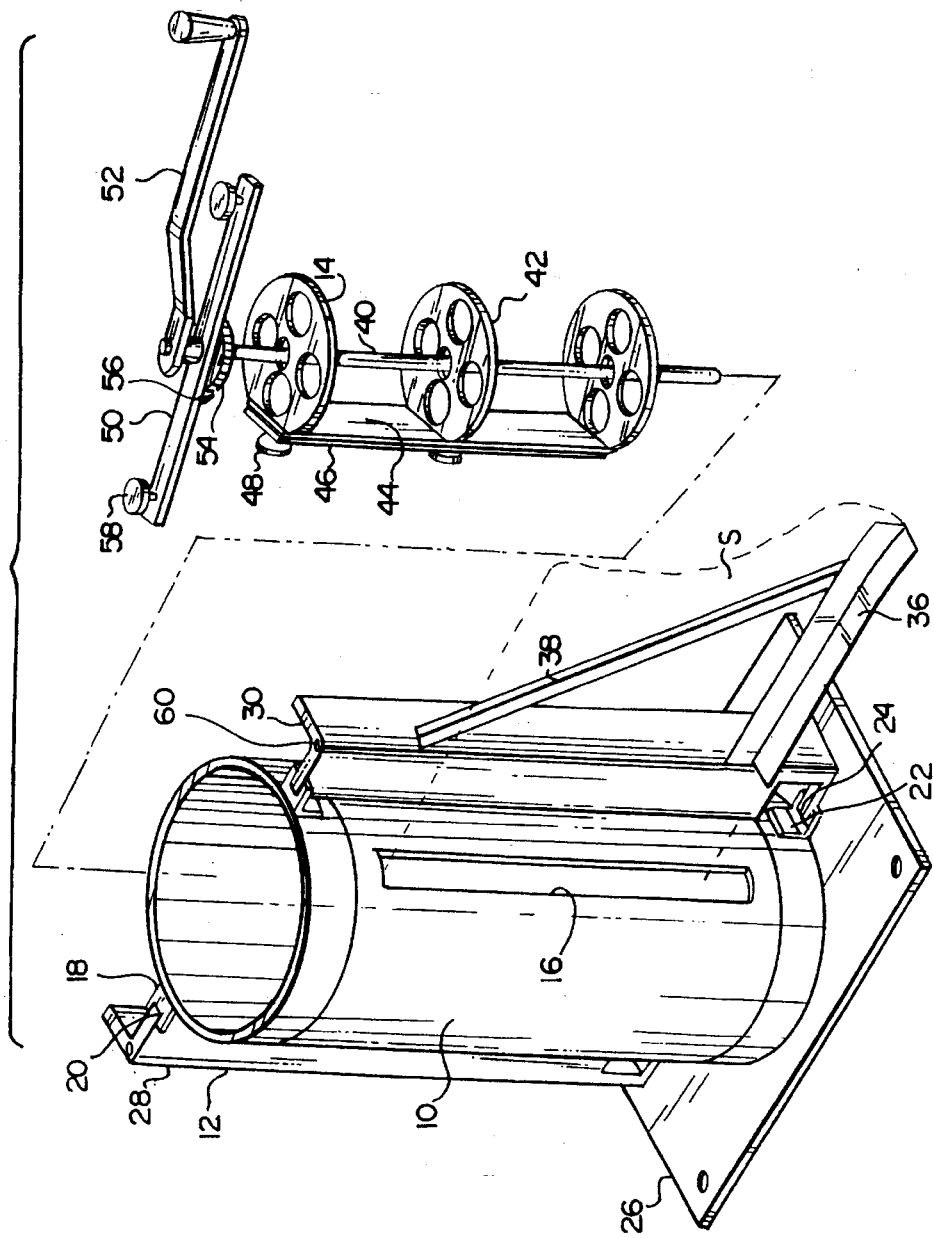
FIG. 1 is a perspective view of an apparatus for forming arcuate insulation sheets for dynamoelectric machines according to the present invention and with parts in exploded juxtaposition.

Referring now to FIG. 1, there is illustrated an apparatus for forming a generally arcuate sheet of plastic material from a flat sheet thereof and which apparatus generally includes a cylindrical mandrel 10, a stand 12 for mounting the cylindrical mandrel 10 and a winding assembly 14. The mandrel 10 comprises an open-ended cylinder having a radius approximating the radius of the rotational part about which the curved or arcuate sheet will be installed. The mandrel 10 includes an elongated slot 16 formed through a side wall thereof and lying generally parallel to the long axis of the cylinder forming the mandrel. While the slot 16 is closed at its opposite ends, the slot may open through one end, preferably the upper end, of the mandrel. The mandrel 10 includes portions of attachment devices for releasably securing the mandrel against rotation in the stand 12. The attachment device portions includes a pair of upper lugs 18 having slotted ends 20 and a pair of lower lugs 22 similarly having a slot 24. The lugs 18 and 22 project at diametrically opposite sides of mandrel 10 at opposite ends thereof for mounting the mandrel 10 in the stand 12.

Stand 12 includes a base 26 having a pair of angle irons 28 and 30 upstanding and secured to the base 26. The angle irons 28 and 30 are spaced diametrically from one another to enable the cylindrical mandrel 10 to lie between the uprights with portions of the angle irons 28 and 30 engaging in the slots 20 and 24 of the lugs 18 and 22, respectively. It will be appreciated that when the lugs and angle irons engage one another, the mandrel 10 is prevented from rotation relative to the stand 12. Further, the lower ends of the angle irons are cut away as at 32 and 34, respectively (see FIG. 2). Consequently, by displacing the mandrel 10 in an upward direction relative to the stand, the lugs 18 and 22 on the mandrel may be positioned out of contact with the angle irons and, hence, the mandrel removed laterally from the stand.

Figure 2:
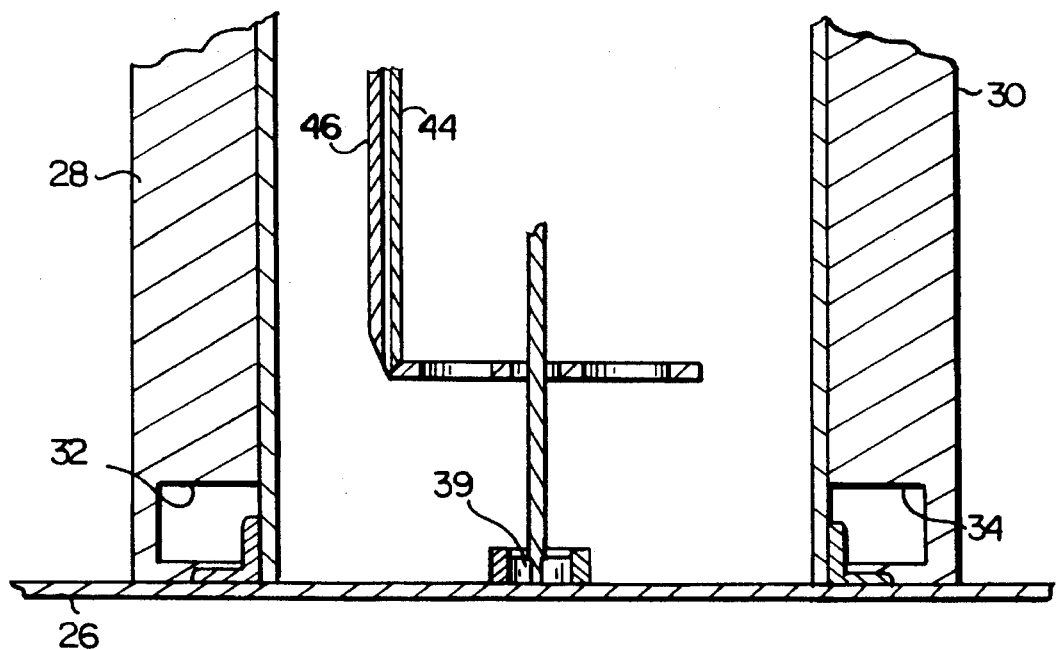
FIG. 2 is an enlarged cross-sectional view thereof.

The angle iron 30 includes a generally horizontally extending angle iron 36 which extends generally horizontally and serves as a guide for receiving a flat sheet of insulation material, designated S. A further guide 38 extends diagonally between the horizontal guide 36 and upright angle iron 30 for supporting the former and guiding the sheet S as described hereinafter. It will, of course, be appreciated that the guide 36 is in alignment with the lower end of the slot 16. Also, as illustrated in FIG. 2, stand 12 includes a center bearing 38 carried on the base plate 26 for cooperation with the winding assembly 14, which will now be described.

Winding assembly 14 includes a center axle or shaft 40 and a plurality of discs 42 carried by the shaft at axially spaced positions therealong. The discs 42 serve as guides for winding the flat sheet of material disposed within the mandrel about the winding assembly 14, as explained hereafter. Along one side of the discs 42, there are provided a pair of clamping plates 44 and 46 which may be releasably clamped one to the other by clamping screws 48. Thus, the clamping plate 44 is secured directly to the discs 42, while the plate 46 may be mounted for movement toward and away from the plate 44 by threading or unthreading action of the clamping screws 48.

At the upper end of the winding assembly, there is provided a support arm 50 in which the axle 40 is journalled. The axle 40 is also connected to a manually rotatable handle 52. Directly below support arm 50 is a toothed wheel 54 mounted for rotation with axle 40. A ratcheting pawl 56 is mounted along the underside of support arm 50 whereby the shaft 40 may be rotated by handle 52 in one direction, i.e., a winding direction, with the pawl and toothed wheel cooperating to prevent rotation of the winding assembly, i.e., the shaft, in the opposite direction. The support arm 50 also includes a pair of screws 58 at its opposite ends for threaded engagement into tapped holes 60 in the angle irons 28 and 30. While these screws 58 can be in the form of pins received in untapped openings, it is preferable to secure the support arm to the stand to facilitate the winding action and to prevent the arm from decoupling with the stand. It will also be appreciated that the tapped openings 60 could be provided in the lugs 18 forming part of the mandrel whereby the support arm could be fixed to the mandrel.

In using the apparatus of the present invention, the winding assembly 14 is disposed within the mandrel with the lower end of the axle or shaft 40 engaging in and being centered by the bearing 38 in the base plate 26. The screws 58 are then threaded into the tapped openings 60 of the stand whereby the winding assembly 40 cannot be removed from within the mandrel, although the assembly can be rotated by rotation of handle 52.

A flat sheet S is then disposed on the horizontal guide 36 with its leading edge in opposition and registration with the slot 16 of the mandrel. By inserting the leading edge of the sheet S through the slot and rotating the winding assembly into position, the leading edge may be inserted between the clamping plates 44 and 46. The clamping screws are then rotated manually by reaching within the mandrel to clamp the leading edge of the sheet S to the winding assembly. With the sheet clamped to the winding assembly, the manual crank arm 52 may be rotated to wind the flat sheet about the winding assembly 14, drawing it into the mandrel. Once the trailing edge of the sheet has been drawn into the mandrel and through the slot 16, it will be appreciated that the flat sheet is guided by the walls of the mandrel and also by the discs 42 such that it assumes an arcuate configuration approximating the radius of the mandrel. With the flat sheet thus in arcuate form within the mandrel, the clamping screws may be backed off to release the leading edge of the arcuate sheet from between the clamping plates 44 and 46. Additionally, the screws 58 may be backed from the tapped holes 60, enabling the winding assembly 14 to be withdrawn axially through the open upper end of the mandrel 10. The mandrel 10 may then be lifted a very short distance such that the lugs 18 and 22 clear the angle irons whereby the mandrel can be displaced laterally and removed from the stand 12. The mandrel with the arcuate sheet is then placed in an oven along with other similar mandrels containing flat sheets for a particular installation. It will be recalled that the sheets are formed of a glass epoxy laminate which comprises a thermosetting material. Thus, the sheets are disposed in an oven, for example, for four hours at 350° F. whereby the plastic insulation sheet will take on a set in the arcuate configuration within the mandrel. The mandrels are then removed from the oven and the sheets removed from the mandrel. The sheets are therefore maintained in the arcuate configuration approximating the curvature of the pads of the dynamoelectric machines about which the insulation is to be installed, the sheets being set in their arcuate configuration and unrestrained.

Figure 3:
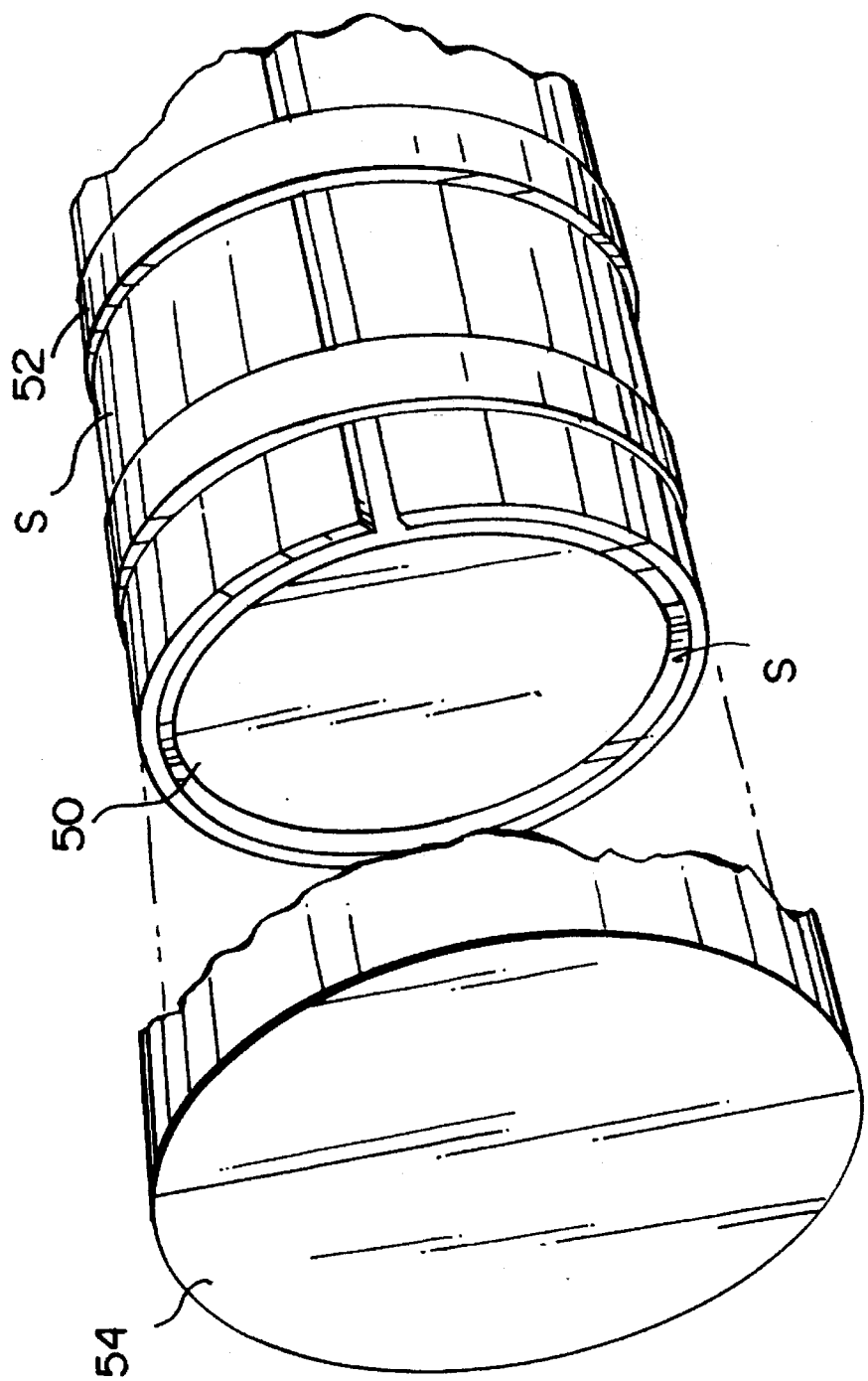
FIG. 3 is an exploded fragmentary perspective view of insulation sheets according to the present invention disposed about a rotor end and a retainer ring.

Referring to FIG. 3, the sheets may then be installed about the rotational pad, e.g., a rotor end 50, without applying substantially any manual force to effect a bend in the sheet. The half-cylindrical arcuate sheets may then be readily secured by tapes 52 and applied to form concentric laminated layers about the rotational pad. The seams between the half-cylindrical sheets of each layer are preferably misaligned with the seams about each underlying or superposed sheets. Ultimately, the sheets are maintained on the rotor end by a shrink-fit retaining ring 54, for example, as set forth in U.S. Pat. No. 5,068,564, the disclosure of which is incorporated herein by reference.

In a preferred embodiment, the sheets are generally provided in a flat configuration approximately 36×18 inches. The sheets are thus formed into semi-circular configurations by the afore-described mandrel and winding assembly. Thus, the diameter of the rotor end may be approximately 30 inches, having an axial length of about 16 inches. The material for forming the glass insulation sheets is an epoxy-phenolic resin/glass laminate, i.e., a continuous filament glass-fiber fabric impregnated with an epoxy-phenolic Novolac resin cured under high pressure.

It will be appreciated that the afore-described apparatus is portable and may therefore be transported to the field site. Field ovens may also be provided whereby field installation of new windings and insulation for such windings may be provided, as well as at original fabrication sites.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of installing insulation between a retaining ring and a rotor of a dynamoelectric machine comprising the steps of:

providing insulation sheets of a glass fabric impregnated with an epoxy-phenolic resin;

thermoforming the glass fabric impregnated sheets in an arcuate configuration for fitting about at least part of the rotor;

fixing the formed sheets on the rotor; and shrink-fitting the retaining ring onto the insulation.

2. A method according to claim 1 wherein the step of providing insulation sheets includes providing a generally cylindrical mandrel having a slot along a side wall thereof extending generally parallel to a cylindrical central axis of said mandrel, inserting a flat sheet of the glass fabric impregnated sheet through the slot for locating a leading edge thereof within the mandrel, clamping the leading edge of the flat sheet to a winding assembly, rotating the winding assembly with the leading edge clamped thereto in the mandrel to wind the flat sheet about the interior of the cylindrical mandrel, heating the mandrel with the wound sheet therein to a temperature to set the plastic material within the mandrel to form at least one of said arcuately configured sheets and removing the arcuate sheet from the mandrel.

3. A method according to claim 2 including locating the winding assembly within the mandrel prior to clamping the flat sheet thereto, clamping the leading edge of the flat sheet to the winding assembly after location of the winding assembly within the mandrel.

4. A method according to claim 3 including unclamping the sheet from the winding assembly and removing the winding assembly from within the mandrel, leaving the arcuate sheet within the mandrel.

5. A method according to claim 3 including unclamping the sheet from the winding assembly and removing the winding assembly from within the mandrel, leaving the arcuate sheet within the mandrel, and wherein the step of fixing the formed sheets on the rotor includes taping the formed sheets about the rotor.

* * * * *